United States Patent
Christie et al.

(10) Patent No.: US 12,449,038 B2
(45) Date of Patent: Oct. 21, 2025

(54) COMPRESSION LIMITING COUPLING PILOT FOR COMPOSITE SEAL

(71) Applicant: ContiTech Deutschland GmbH, Hannover (DE)

(72) Inventors: Dean Christie, Royal Oak, MI (US); April Dunham, Royal Oak, MI (US); Juan Espino, Troy, MI (US); Jonathan Messerschmidt, Murrhardt (DE); Arthur Kleiber, Hamburg (DE)

(73) Assignee: ContiTech Deutschland GmbH, Hannover (DE)

( * ) Notice: Subject to any disclaimer, the term of this patent is extended or adjusted under 35 U.S.C. 154(b) by 52 days.

(21) Appl. No.: 18/325,260

(22) Filed: May 30, 2023

(65) Prior Publication Data
US 2024/0401701 A1 Dec. 5, 2024

(51) Int. Cl.
*F16L 23/18* (2006.01)
*F16J 15/3284* (2016.01)
*F16L 23/032* (2006.01)

(52) U.S. Cl.
CPC ......... *F16J 15/3284* (2013.01); *F16L 23/032* (2013.01); *F16L 23/18* (2013.01)

(58) Field of Classification Search
CPC ............ F16L 23/16; F16L 23/18; F16L 57/06
See application file for complete search history.

(56) References Cited

U.S. PATENT DOCUMENTS

| | | | | |
|---|---|---|---|---|
| 2,401,923 A | * | 6/1946 | Gleeson | F16L 23/18 220/327 |
| 3,114,561 A | * | 12/1963 | Creath | F16L 23/18 277/626 |
| 3,195,906 A | * | 7/1965 | Moyers | F16L 23/18 277/611 |
| 3,367,682 A | * | 2/1968 | Meriano | F16L 23/18 277/614 |
| 3,448,986 A | * | 6/1969 | Dial | F16L 23/18 92/169.1 |

(Continued)

FOREIGN PATENT DOCUMENTS

| | | |
|---|---|---|
| DE | 102004035210 A1 | 3/2005 |
| EP | 3901505 A1 | 10/2021 |

(Continued)

OTHER PUBLICATIONS

European Search Report dated Oct. 9, 2024 of counterpart EP application 24177204.5.

*Primary Examiner* — Zachary T Dragicevich
*Assistant Examiner* — Fannie Kee
(74) *Attorney, Agent, or Firm* — Gregory Adams; Richard A. Wolf

(57) ABSTRACT

A coupling system (100) is disclosed. The system (100) includes an insert (102), an upper part (106) and a flange (104). The insert (102) includes a plurality of pillar devices and has a ring comprised of plastic material. The upper part has a circular shaped opening. The flange has a washer or elastomer seal element (110). Pilot (114 and 116) are a molded plastic that encase the insert ring (102). The washer element is adjacent to and concentric with the circular shaped opening and is comprised of a rubber material. The pillar devices are configured to mitigate force from the upper part to the washer element of the flange. The insert or ring (102) can have an L-shaped profile (502).

15 Claims, 8 Drawing Sheets

(56) References Cited

U.S. PATENT DOCUMENTS

| | | | |
|---|---|---|---|
| 5,904,381 A * | 5/1999 | Ohmi | F16L 23/16 |
| | | | 285/379 |
| 6,318,768 B1 | 11/2001 | Gehres | |
| 7,621,568 B2 | 11/2009 | Schroeder et al. | |
| 8,104,773 B2 | 1/2012 | Schroeder et al. | |
| 8,523,244 B2 | 9/2013 | Schroeder et al. | |
| 2005/0023828 A1 | 2/2005 | Takeuchi et al. | |
| 2007/0022159 A1 | 1/2007 | Zhu et al. | |
| 2007/0222159 A1 | 9/2007 | Baxi et al. | |
| 2011/0140374 A1 * | 6/2011 | Dubiel | F16L 23/18 |
| | | | 277/628 |
| 2011/0214755 A1 | 9/2011 | Kesler et al. | |
| 2017/0059064 A1 * | 3/2017 | Thrift | F16L 23/18 |
| 2017/0059068 A1 * | 3/2017 | Di Giusto | F16L 23/18 |
| 2018/0370326 A1 | 12/2018 | Tilders | |
| 2020/0200307 A1 | 6/2020 | Kesler et al. | |
| 2022/0282817 A1 * | 9/2022 | Güttinger | F16L 23/16 |

FOREIGN PATENT DOCUMENTS

| | | | | |
|---|---|---|---|---|
| KR | 200166988 Y1 * | 1/2000 | | F16L 23/18 |
| KR | 100737157 B1 * | 7/2007 | | F16L 23/18 |
| WO | WO-2017011019 A1 * | 1/2017 | | F16L 23/18 |

\* cited by examiner

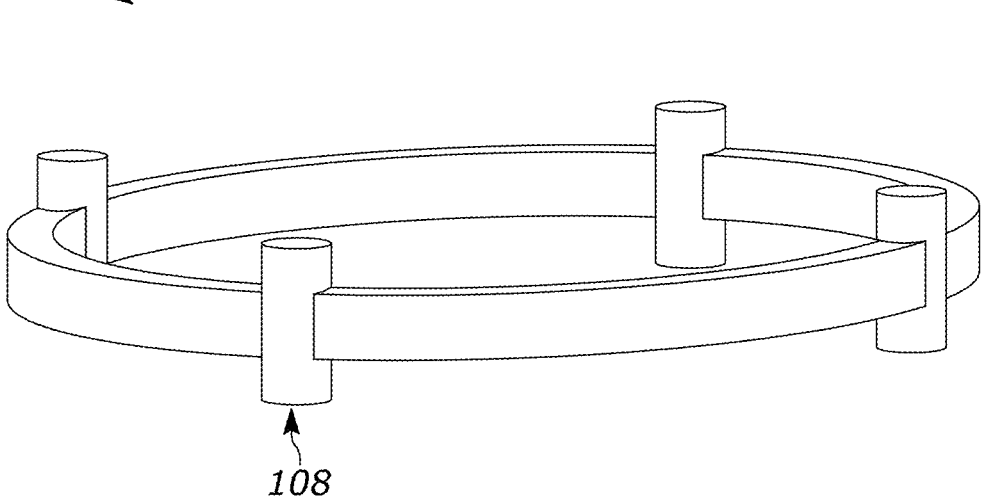
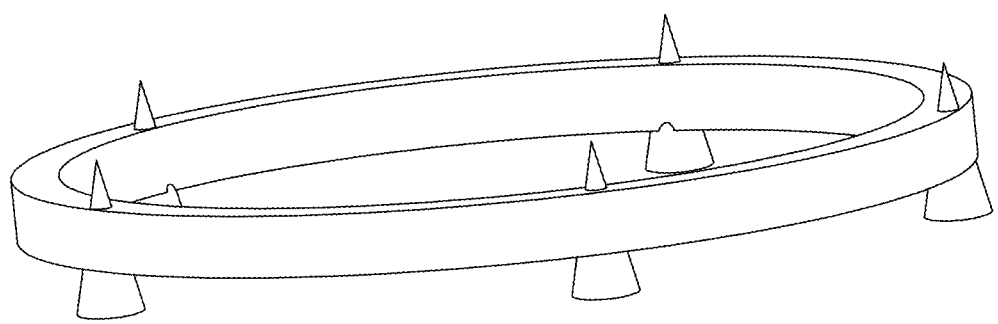
FIG. 2
FIG. 3

US 12,449,038 B2

COMPRESSION LIMITING COUPLING PILOT FOR COMPOSITE SEAL

FIELD

The field to which the disclosure generally relates is fluid transport, and in particular couplings used in fluid transport.

BACKGROUND

Vehicles typically incorporate a refrigerant based cooling system for a cabin area of the vehicle. The cooling system uses the refrigerant to draw thermal energy (heat) away from the cabin area.

The cooling system circulates refrigerant from an evaporator and enters the gas compressor in the engine bay and is compressed to a higher pressure, resulting in a higher temperature as well. The hot, compressed refrigerant is now at a temperature and pressure at which it can be condensed and is routed through a condenser, typically in front of the vehicle's radiator. Here the refrigerant is cooled by air flowing across the condenser coils and condensed into a liquid. Thus, the circulating refrigerant rejects heat from the system and the heat is carried away by the air.

Refrigerant is typically toxic, environmentally hazardous and may lead to ozone depletion and the like. A variety of hoses, tubes, couplings, connection arrangements, connections and the like are used to circulate the refrigerant about the engine compartment. These conveying devices are subject to heat, pressure, vibration and the like, which can result in damage and/or leaking of refrigerant.

Techniques are needed to mitigate cooling system damage, refrigerant leakage and the like.

BRIEF DESCRIPTION OF THE DRAWINGS

FIG. 2 is a diagram illustrating the insert 102 in accordance with one or more embodiments.

FIG. 3 is a diagram illustrating the insert 102 in accordance with one or more embodiments.

DETAILED DESCRIPTION

Figure 1:
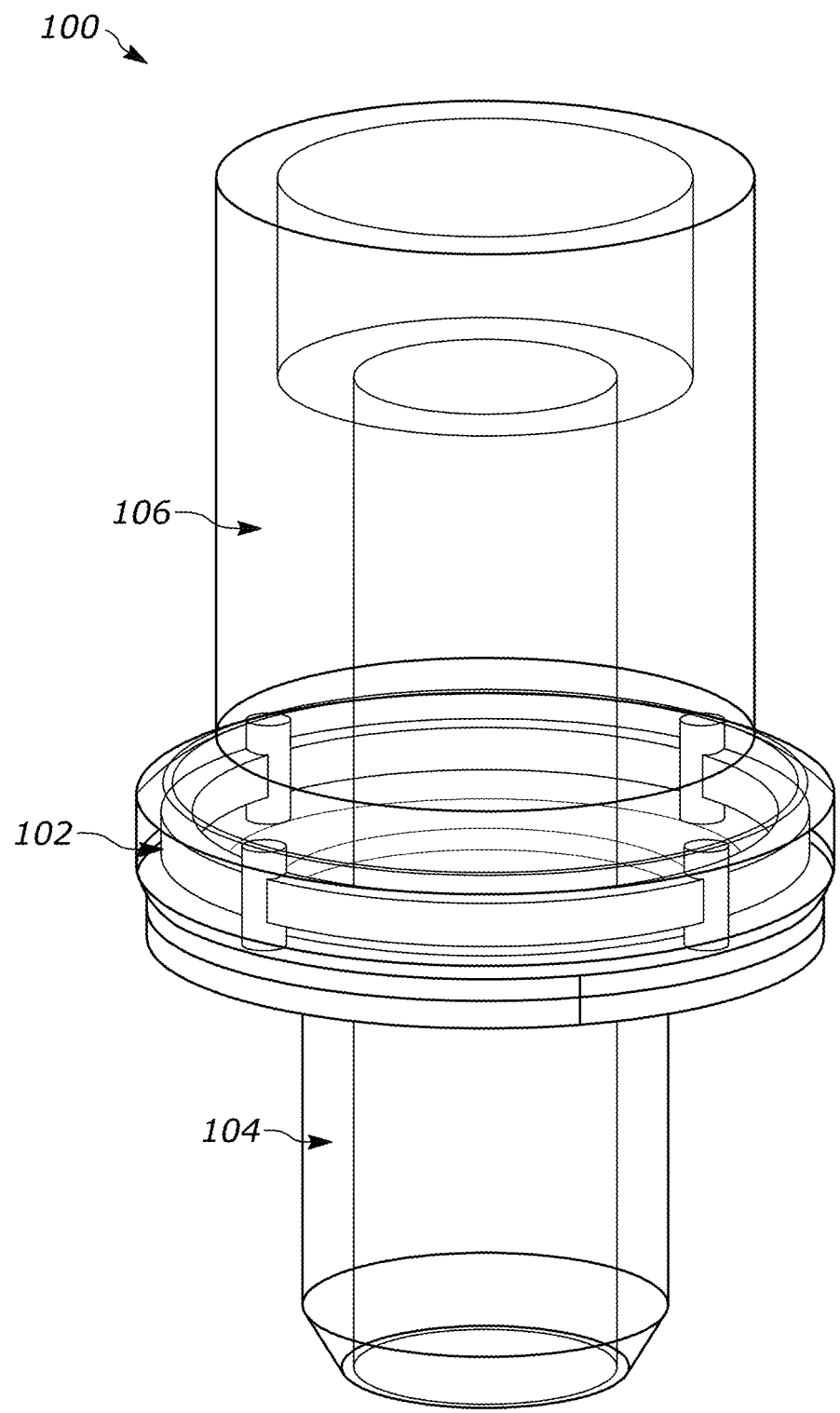
FIG. 1 is a diagram illustrating a coupling arrangement system 100 that limits or mitigates compressive forces in accordance with one or more embodiments.

The following description of the variations is merely illustrative in nature and is in no way intended to limit the scope of the disclosure, its application, or uses. The description is presented herein solely for the purpose of illustrating the various embodiments of the disclosure and should not be construed as a limitation to the scope and applicability of the disclosure. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a value range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific data points, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one, and the singular also includes the plural unless otherwise stated.

The terminology and phraseology used herein is for descriptive purposes and should not be construed as limiting in scope. Language such as "including", "comprising", "having", "containing", or "involving", and variations thereof, is intended to be broad and encompass the subject matter listed thereafter, equivalents, and additional subject matter not recited.

Also, as used herein, any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

It is appreciated that various refrigerants such as R12, R134a, R1234yf, CO2 and mixtures and/or variations thereof have been used in the air conditioning system for the vehicle. However, environmental concerns exist. As a result, legislation has been passed by various governmental agencies of the United States and the European Union, for example, requiring that the air conditioning system operate with substantially no refrigerant leaks.

Seal structures having multiple seals have been used to militate against leaks from the fittings used in the air conditioning system. These structures include rubber O-rings and elastomeric seals, for example. However, over time, such seals can degrade. Damage to the seal structure can also occur due to improper installation or handling.

Connection arrangements or couplings are also to be particularly compact and lightweight. Pipe connections in mobile air conditioning systems may comprise plastic material to mitigate weight. In other examples, the pipes or pipe connections can comprise metal. The pipes are attached via connectors, which are provided with sealing elements. It is necessary to connect the connectors firmly and with durable sealing both to the pipe and detachably to a further pipe or to another component. However, in air conditioning systems and in particular in mobile air conditioning systems, in addition to high pressures and temperatures, vibrations occur and are transmitted within the components of the air conditioning system. The connection arrangement therefore has to be constructed in such a way that a durable connection is provided in spite of vibrations and high pressures, and that coolant leakage cannot occur.

Moreover, it is important that mobile air conditioning systems are constructed to be lightweight. Therefore, the number of fastening means fixing together the components of the air conditioning system is also limited.

Loss of contact pressure on seal due to material creep during normal operating conditions resulting in an interior fluid leak.

The use of mechanical means to limit polymer material creep

Plastic air conditioning assemblies used in passenger vehicles are currently only using radial o-ring seal connectors that offer higher emissions than the compression seal washer connections. The o-ring connection emissions is 12.5 times higher than the compression seal washer per the SAE J2727 Mobile Air Conditioning System Refrigerant Emission Charts for R-134a, R-1234yf, and R-152a. The increase in emissions can result in lower CARB credits for the vehicle manufacturer & higher warranty costs due to air conditioning system recharging Ability to use additional materials outside of ferrous and nonferrous in air conditioning compression connections.

Thinning of fitting bead thickness (critical dimension) and radial expansion of the bead diameter.

The problem caused by having a non-metal pilot is usually solved by replacing the pilot material with low creep properties (deformation caused by shear or tensile stress). For example, aluminum or steel.

Increasing torque of mounting fasteners beyond the sealing component recommendations to compensate for loss of seal compression caused by creep.

The sealing component type is transitioned from a compression design to a radial axial seal design.

FIG. 1 is a diagram illustrating a coupling arrangement system 100 that limits or mitigates compressive forces in accordance with one or more embodiments. The system 100 is provided for illustrative purposes and it is appreciated suitable variations are contemplated.

The system 100 includes a pilot 106, an insert 102 with pillars, a compression seal washer, a flange (or coupler, end plate and the like), and a female mating coupler. The system 100 also includes a coupler 104, also referred to as a male pilot that provides centering of the sealing element 110 and alignment to the female mating coupler of pilot 106. The female coupler is shown as 118 in FIG. 5 below.

The insert is configured to mitigate transfer of forces between the pilot 106, the coupler 104 and the like by incorporating pillars.

The insert 102 is ring shaped and comprises a metal ring encased in a plastic material. The ring shaped insert, also referred to as a ring, 102 has a diameter, height and width. The composite of plastic and metal ring material provides superior creep and resists compression than other materials, such as only plastic material.

The insert 102 includes a plurality of pillar devices 108. The pillar devices 108 comprise a composite of plastic and metal material and have a height and width that substantially exceeds the height and width of the ring portion of the insert. The pillar devices 108 have a suitable shape configured to sustain compression forces between the bocks/flanges, such as cylindrical, conical and the like. There is a suitable number of pillar devices 108, such as 3 to 15, depending on a size of the sealing element.

The ring shaped insert 102 also comprises ferrous or nonferrous material and is encased in the plastic material, which can also be used to make up the fluid conveying pilot.

Some example dimensions for the ring are 15 mm. Some example dimensions for the plurality of pillar devices is about 1 mm diameter by 2.5 mm in height.

FIG. 2 is a diagram illustrating the insert 102 in accordance with one or more embodiments. The insert 102 is provided for illustrative purposes and it is appreciated suitable variations are contemplated.

The pillar devices 108 are shown having a cylindrical shape or construction.

FIG. 3 is a diagram illustrating the insert 102 in accordance with one or more embodiments.

The pillar devices 108 are shown having a cone shape.

It is appreciated that the pillar devices 108 can have other suitable shapes and that other suitable shapes are contemplated.

Figure 4:
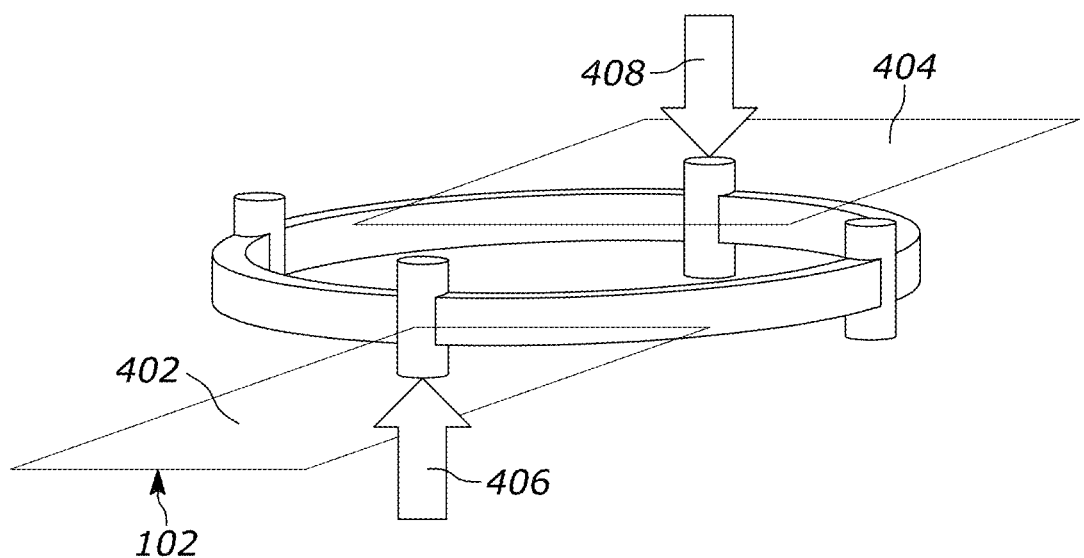
FIG. 4 is a diagram illustrating action of forces between the insert 102, seal washer and block in accordance with one or more embodiments.

FIG. 4 is a diagram illustrating action of forces 406, 408 between the insert 102, seal washer 402 and block 404 in accordance with one or more embodiments.

In this example, a substantial downward force is received from a block/flange. The pillar devices 108 (see, FIG. 2) mitigate and/or prevent the downward force from impacting the sealing element or sealing washer and the like.

The pillar devices 108 provide consistent compressive forces on the sealing element through varied thermal environments.

For example, thermal environments include about negative 40 degrees C. to about 150 degrees C.

Figure 5:
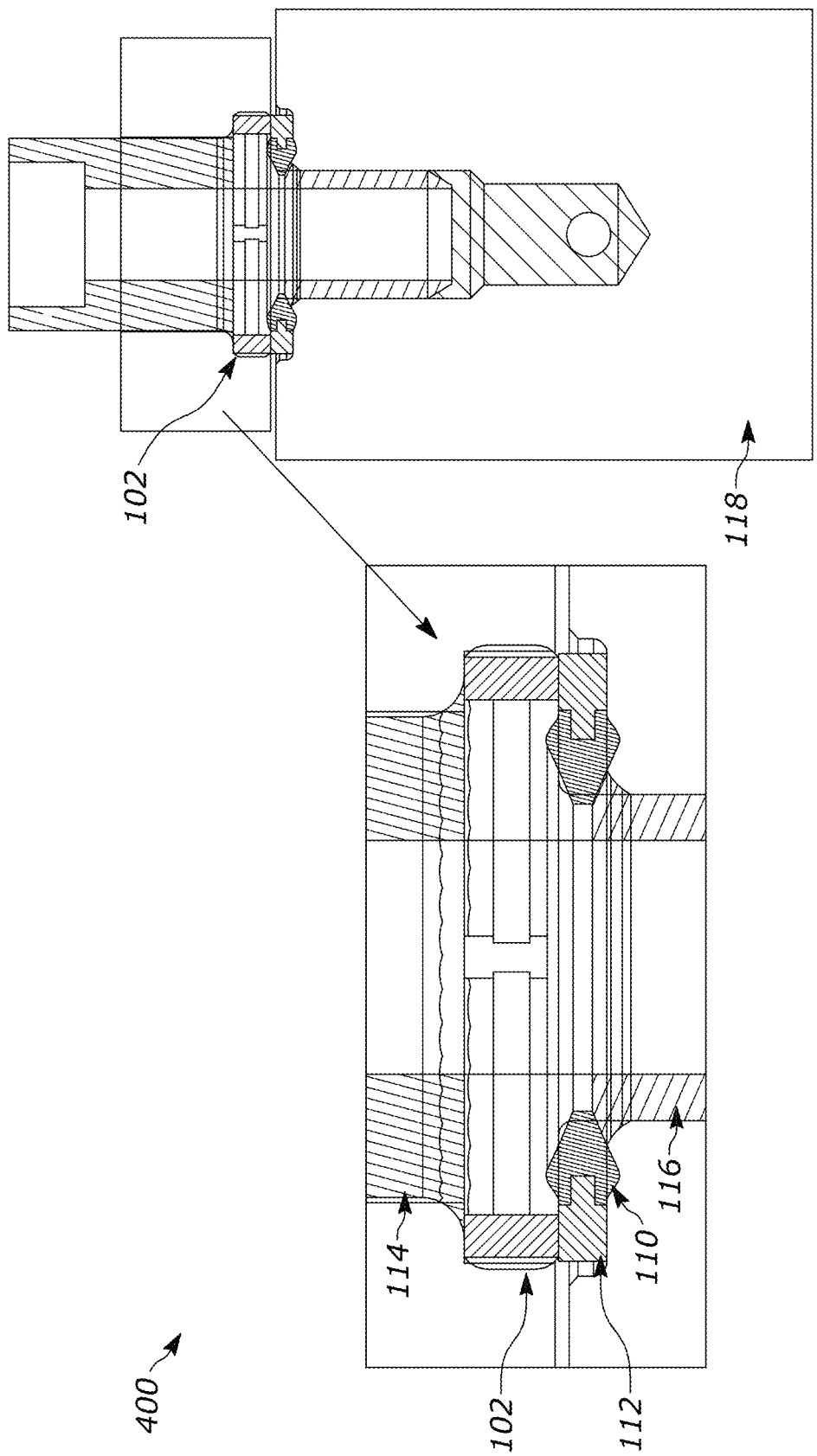
FIG. 5 shows a close up view 400 of a portion of the system 100 in accordance with one or more embodiments.

FIG. 5 shows a close up view 400 of a portion of the system 100 in accordance with one or more embodiments. The view 400 is provided for illustrative purposes and it is appreciated suitable variations are contemplated.

The insert 102 is shown positioned above a sealing element 110.

A collar 112 holds the sealing element 110 in place. The collar 112 can be comprised of metal.

Connections 114 and 116 can convey fluid, gas, refrigerant and the like.

Figure 6:
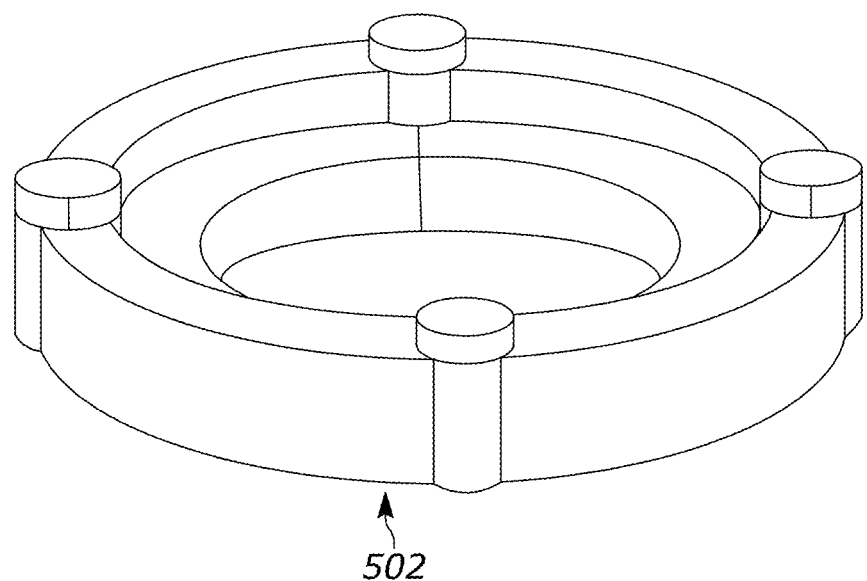
FIG. 6 is a diagram illustrating a coupling arrangement in accordance with one or more embodiments.

FIG. 6 is a diagram illustrating a coupling arrangement in accordance with one or more embodiments.

A ring 502 is included and is similar to the ring 102 and includes an L-shaped profile.

The ring 502 includes a wider base that is typically adjacent the coupler 118.

Figure 7:
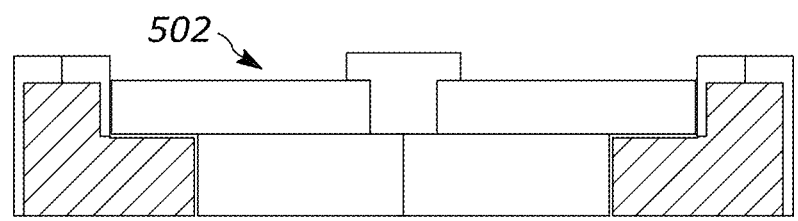
FIG. 7 is a perspective view illustrating the ring 502 in accordance with one or more embodiments.

FIG. 7 is a perspective view illustrating the ring 502 in accordance with one or more embodiments.

Figure 8:
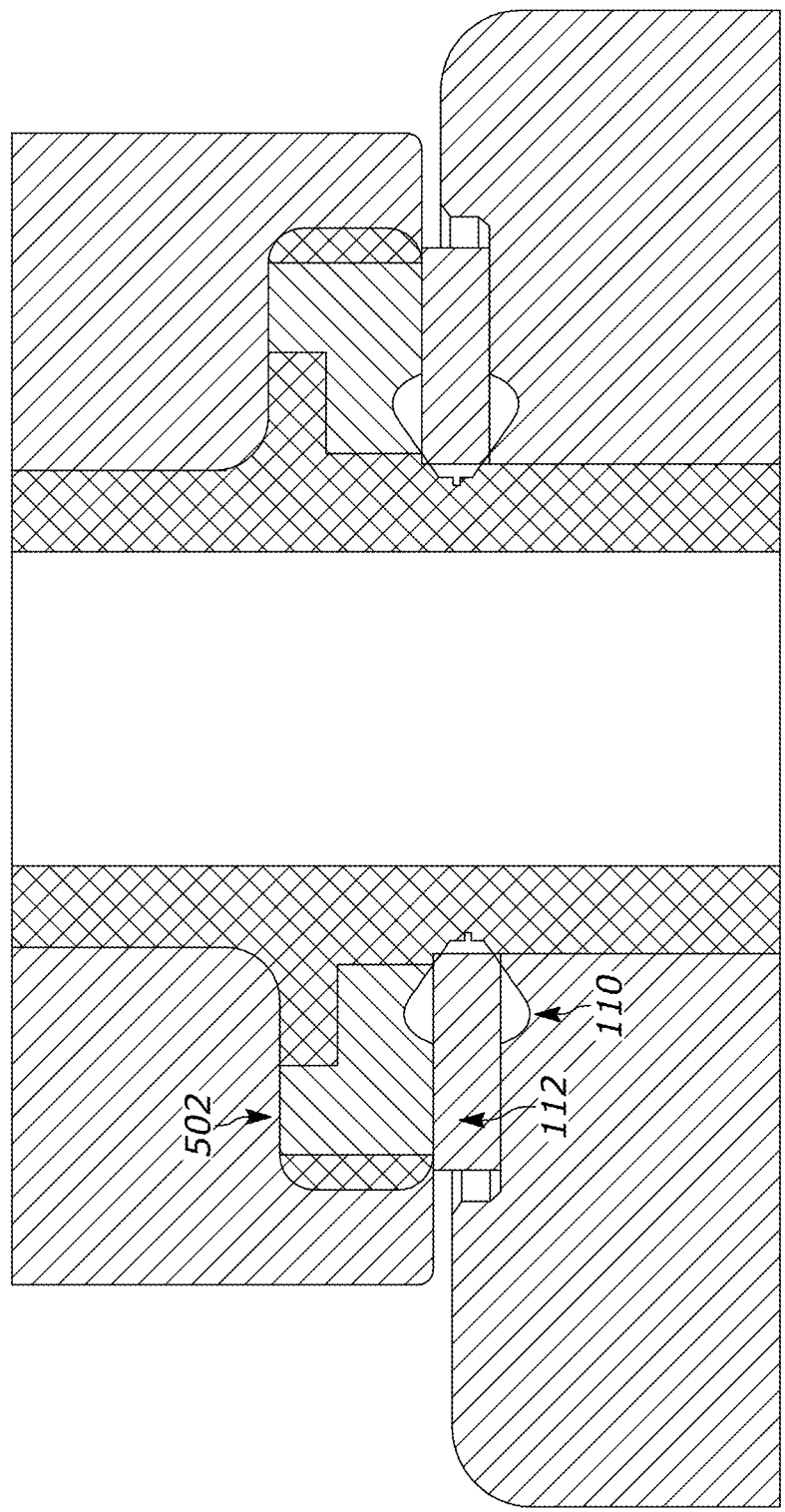
FIG. 8 is a front view illustrating the ring 502 in accordance with one or more embodiments.

FIG. 8 is a front view illustrating the ring 502 in accordance with one or more embodiments.

Figure 9:
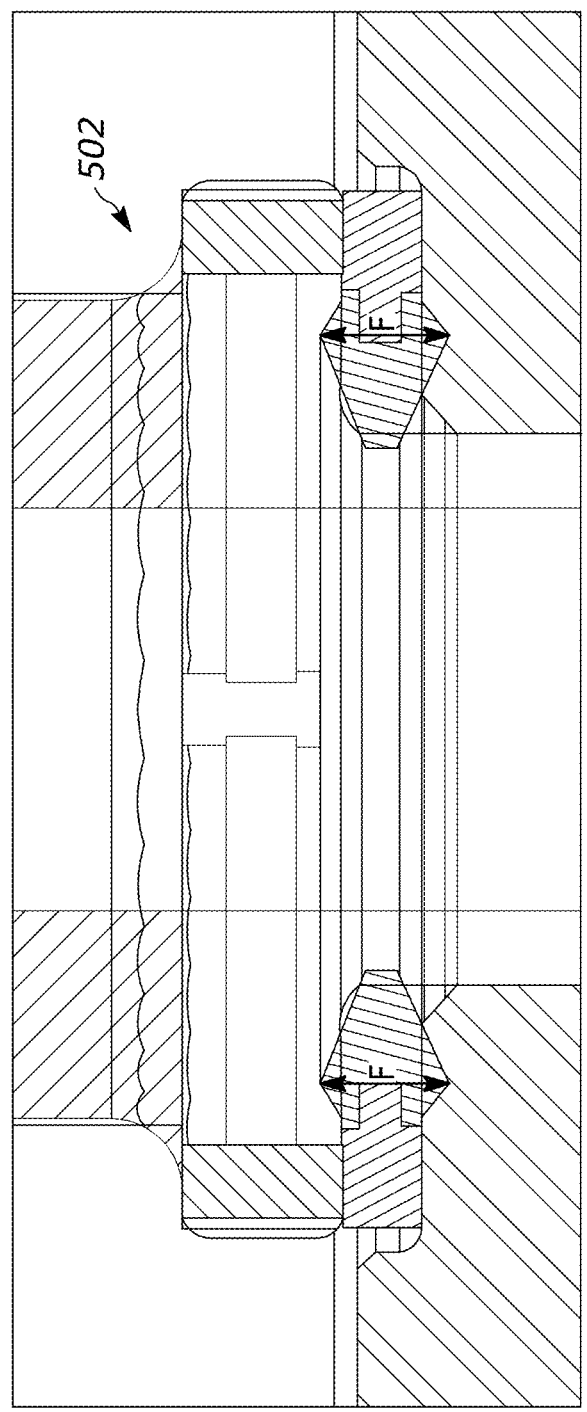
FIG. 9 is a cross sectional view of a coupling arrangement in accordance with one or more embodiments.

FIG. 9 is a cross sectional view of a coupling arrangement in accordance with one or more embodiments.

The L-shaped ring is shown with the collar 112 and the sealing element 110 in place.

Figure 10:
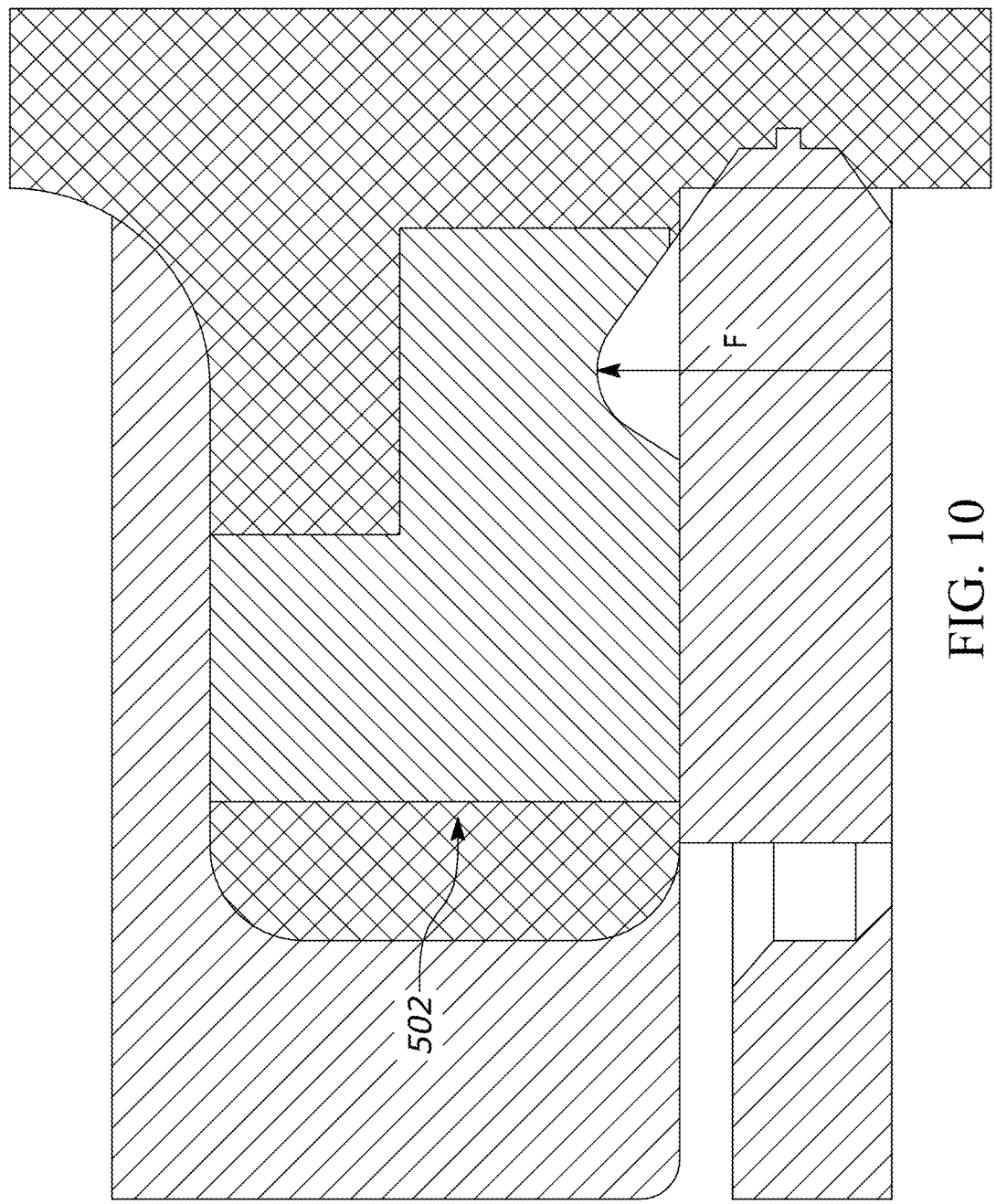
FIG. 10 is a diagram illustrating the coupling arrangement and depicting reaction force.

FIG. 10 is a diagram illustrating the coupling arrangement and depicting reaction force.

A high reaction force F of the elastomeric seal could lead to a creeping of the plastic material in that area. The creeping can create a risk of leakage. The L-shaped ring can mitigate. Generally, creeping refers to deformation of plastic material caused by shear or tensile stress, temperature exposure and the like.

In some aspects, the techniques described herein relate to a force mitigating coupling system 100 including: a ring shaped insert 102,502 having a metal ring encased a plastic material that forms a composite material and a generally circular shape and a plurality of pillar devices; an upper part having a circular shaped opening; a flange having a washer element, the washer element adjacent to and concentric with the circular shaped opening and included of a rubber material; and the pillar devices configured to configured to mitigate force from the upper part to the washer element of the flange.

In some aspects, the techniques described herein relate to a system, further including a collar to secure the washer element to the flange, the collar included of metal.

In some aspects, the techniques described herein relate to a system, the plurality of pillar devices having a cylindrical and/or conical shape and a height equal to or larger than a height of the ring.

In some aspects, the techniques described herein relate to a system, the pillar devices having a shape configured to mitigate compression forces transferred by the flange.

In some aspects, the techniques described herein relate to a system, the plurality of pillar devices including four (4) equally spaced pillar devices.

In some aspects, the techniques described herein relate to a system, the plurality of pillar devices include from about 3 to 15 individual pillar devices.

In some aspects, the techniques described herein relate to a system, the flange including a metal material.

In some aspects, the techniques described herein relate to a system, the coupling configured to convey refrigerant.

In some aspects, the techniques described herein relate to a system, the mitigated force being about 13 kN.

In some aspects, the techniques described herein relate to a system, the ring having a diameter of about 8 to 25 mm.

In some aspects, the techniques described herein relate to a system, the ring having a height of about 1 to 10 mm.

In some aspects, the techniques described herein relate to a system, the ring further including ferrous material and is encased in the plastic material to include a fluid conveying pilot.

In some aspects, the techniques described herein relate to a system, the ring including nonferrous material and is encased in the plastic material to include a fluid conveying pilot.

In some aspects, the techniques described herein relate to a system, the plastic material including polyamide with glass fiber.

In some aspects, the techniques described herein relate to a system, the ring having an L-shaped profile.

In some aspects, the techniques described herein relate to a system, the profile of the ring (502) including a wider base portion adjacent a coupler (118).

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first", "second", and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially-relative terms, such as "inner", "adjacent", "outer", "beneath", "below", "lower", "above", "upper", and the like, may be used herein for ease of description to describe one element or feature's relationship to another element(s) or feature(s) as illustrated in the figures. Spatially-relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially-relative descriptors used herein interpreted accordingly.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A force mitigating coupling system comprising:
    a ring shaped insert being a metal ring encased in a plastic material that forms a composite material and a generally circular shape and a plurality of pillar devices;
    an upper part having a circular shaped opening;
    a flange having a washer element, the washer element adjacent to and concentric with the circular shaped opening and comprised of a rubber material;
    the plurality of pillar devices configured to mitigate force from the upper part to the washer element of the flange; and
    the plurality of pillar devices having a cylindrical shape and a height larger than a height of the ring.

2. The system of claim 1, further comprising a collar to secure the washer element to the flange, the collar comprised of metal.

3. The system of claim 1, the plurality of pillar devices having a shape configured to mitigate compression forces transferred by the flange.

4. The system of claim 1, the plurality of pillar devices comprising four equally spaced pillar devices.

5. The system of claim 1, the plurality of pillar devices comprising 3 to 15 individual pillar devices.

6. The system of claim 1, the flange comprising a metal material.

7. The system of claim 1, the coupling system configured to convey refrigerant.

8. The system of claim 1, the mitigated force being about 13 kN.

9. The system of claim 1, the ring having a diameter of about 8 to 25 mm.

10. The system of claim 1, the ring having a height of about 1 to 10 mm.

11. The system of claim 1, the metal ring further comprising ferrous material and is encased in the plastic material to comprise a fluid conveying pilot.

12. The system of claim 11, the plastic material comprising polyamide with glass fiber.

13. The system of claim 12, a profile of the ring including a wider base portion adjacent a coupler.

14. The system of claim 1, the metal ring comprising nonferrous material and is encased in the plastic material to comprise a fluid conveying pilot.

15. The system of claim 1, the ring having an L-shaped profile.

\* \* \* \* \*